US012348946B1

(12) United States Patent
Miesner

(10) Patent No.: US 12,348,946 B1
(45) Date of Patent: Jul. 1, 2025

(54) VOICE COIL AND SPEAKER WITHOUT COIL FORMER

(71) Applicant: United States of America as Represented by the Secretary of the Navy, Arlington, VA (US)

(72) Inventor: John Miesner, Fairfax, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 196 days.

(21) Appl. No.: 18/461,841

(22) Filed: Sep. 6, 2023

Related U.S. Application Data

(60) Provisional application No. 63/500,120, filed on May 4, 2023.

(51) Int. Cl.

| | |
|---|---|
| ***H04R 9/04*** | (2006.01) |
| ***H04R 7/12*** | (2006.01) |
| ***H04R 7/18*** | (2006.01) |
| ***H04R 9/02*** | (2006.01) |
| ***H04R 9/06*** | (2006.01) |

(52) U.S. Cl.
CPC ............... *H04R 9/046* (2013.01); *H04R 7/12* (2013.01); *H04R 7/18* (2013.01); *H04R 9/025* (2013.01); *H04R 9/045* (2013.01); *H04R 9/06* (2013.01); *H04R 2400/11* (2013.01)

(58) Field of Classification Search
CPC . H04R 9/046; H04R 7/12; H04R 7/18; H04R 9/025; H04R 9/045; H04R 9/06; H04R 2400/11; H04R 2209/041; H04R 11/00
USPC ......................... 381/401, 400, 406, 396, 414
See application file for complete search history.

(56) References Cited

U.S. PATENT DOCUMENTS

| | | | | |
|---|---|---|---|---|
| 7,016,515 | B2 | 3/2006 | Ohashi | |
| 7,386,144 | B2 | 6/2008 | Vincent | |
| 7,412,071 | B2 * | 8/2008 | Wu | H04R 9/025 381/409 |
| 7,848,058 | B2 | 12/2010 | Huang | |
| 11,013,101 | B2 | 5/2021 | MacDonald | |
| 11,611,830 | B2 | 3/2023 | O'Brien | |
| 2010/0019584 | A1 * | 1/2010 | Vercelli | H04R 9/025 381/406 |

* cited by examiner

*Primary Examiner* — Sunita Joshi
(74) *Attorney, Agent, or Firm* — U.S. Department of the Navy, Office of the General Counsel; Jesus J. Hernandez

(57) ABSTRACT

Example embodiments provide a voice coil apparatus that may comprise corner posts, a voice coil wound directly on to the corner posts, the coil forming straight sides between the corner posts due to winding tension, and a center flux return having straight sides and having a continuous plated layer of electrically conductive material, the center flux return being made of a ferromagnetic material. The voice coil apparatus may further comprise rubber mounts at corners of the center flux return and supporting the corner posts, and configured to provide high lateral compression stiffness and low axial shear stiffness in order to facilitate axial movement of the voice coil. In example embodiments, the voice coil lacks a coil former. The rubber mounts and the corner posts establish a uniform offset. The continuous plated layer serves as a shorted turn.

3 Claims, 5 Drawing Sheets

VOICE COIL AND SPEAKER WITHOUT COIL FORMER

CROSS-REFERENCE TO RELATED APPLICATIONS

This application claims the benefit of U.S. Provisional Application No. 63/500,120 filed May 4, 2023, titled "VOICE COIL AND SPEAKER WITHOUT COIL FORMER," incorporated herein by reference.

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

FIELD

The invention relates to an electro-dynamic apparatus, particularly to voice coils.

BACKGROUND

Permanent magnet voice coil speakers employ a diaphragm which is vibrated by a current conducting voice coil that resides in a magnetic flux from one or more permanent magnets. The interaction between the current passing through the voice coil and the magnetic field causes the voice coil to oscillate in accordance with the electrical current and drive the diaphragm to produce sound.

Speaker design goals are to produce a high level of audio power with low distortion (high fidelity) in a compact size. One limitation on design is that the inductance of the voice coil reduces the current flow as frequency increases which reduces the frequency response range and causes harmonic distortion. A shorted turn is commonly used to reduce the voice coil flux linkage and thereby the inductance. The shorted turn effectiveness is primarily determined by the offset to the voice coil conductors. A larger offset allows the flux from individual voice coil turns to link while a smaller offset interrupts flux lines preventing linkage and reducing inductance.

In a conventional speaker, the voice coil is wound onto a voice coil former which supports the coil and transfers the force generated in the coil to the speaker diaphragm to produce sound. The voice coil former, the voice coil, and the diaphragm are the moving parts of the speaker.

In a conventional speaker, the voice coil former and voice coil are mounted in a magnetic gap through which magnetic flux from one or more permanent magnets flows. The magnetic gap must be wide enough to accommodate the voice coil former and the voice coil with sufficient air separation on both the inside and the outside to ensure that there is no contact with the stationary components. A wide magnetic gap increases the reluctance of the permanent magnet flux path reducing the magnetic field density in the voice coil and therefore the speaker efficiency. A wide magnetic gap also reduces the effectiveness of the shorted turn which must be offset from the voice coil.

SUMMARY

Example embodiments provide a voice coil apparatus that may comprise corner posts, a voice coil wound directly on to the corner posts, the coil forming straight sides between the corner posts due to winding tension, and a center flux return having straight sides and having a continuous plated layer of electrically conductive material, the center flux return being made of a ferromagnetic material. The voice coil apparatus may further comprise rubber mounts at corners of the center flux return and supporting the corner posts, and configured to provide high lateral compression stiffness and low axial shear stiffness in order to facilitate axial movement of the voice coil. In example embodiments, the voice coil lacks a coil former. The rubber mounts and the corner posts establish a uniform offset. The continuous plated layer serves as a shorted turn.

BRIEF DESCRIPTION OF DRAWINGS

The accompanying figures are included to provide a further understanding of example embodiments, and are incorporated in and constitute part of this specification. In the figures.

DETAILED DESCRIPTION

Figure 1A:
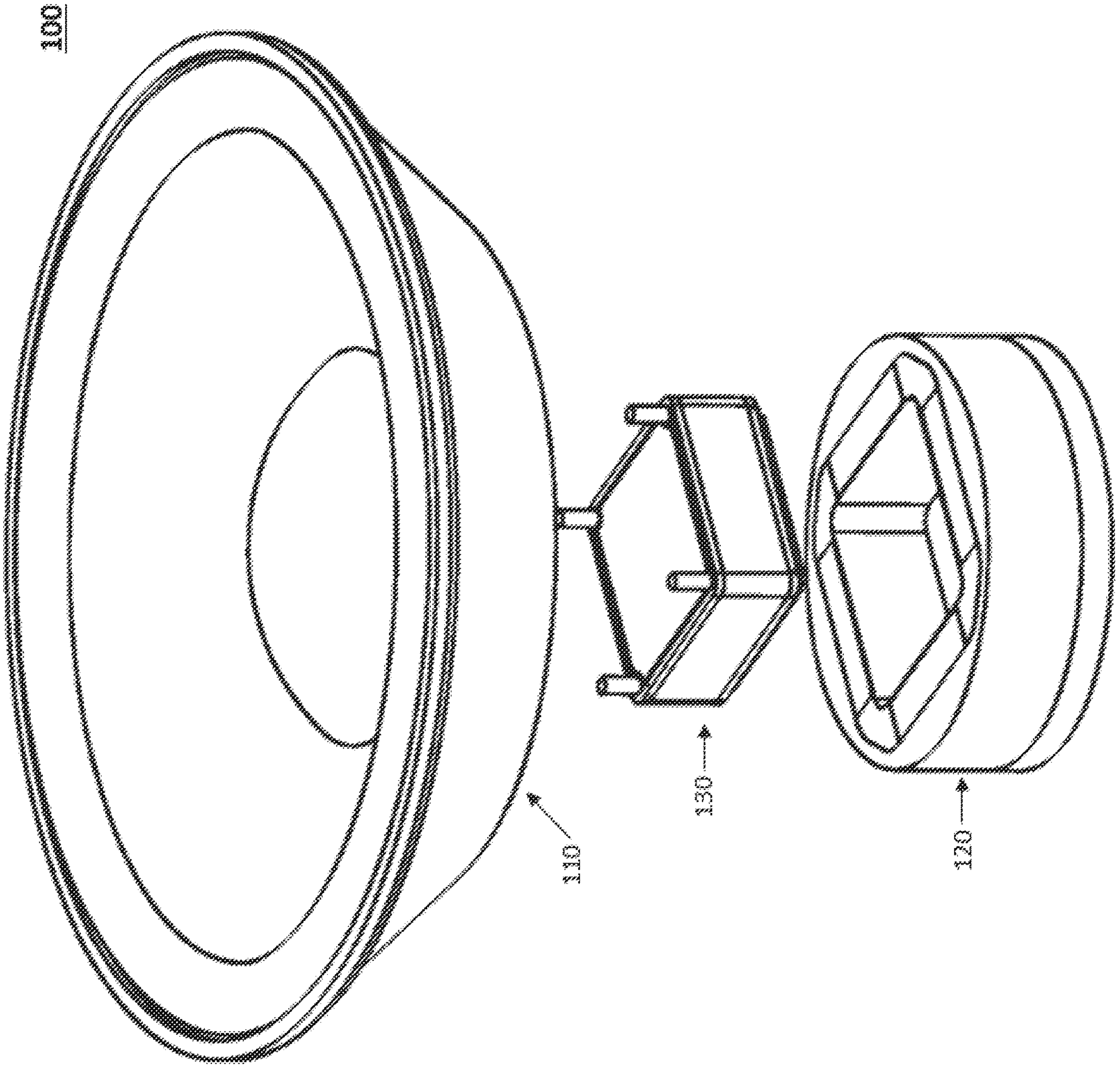
FIG. 1A is an exploded view of the voice coil speaker without coil former, according to an example embodiment.

In the following description, for purposes of explanation and not limitation, specific details are set forth such as particular structures, designs, techniques, etc., in order to provide a thorough understanding of the example embodiments. However, it will be apparent to those skilled in the art that the disclosed subject matter may be practiced in other illustrative embodiments that depart from these specific details. In some instances, detailed descriptions of well-known elements and/or method are omitted so as not to obscure the description with unnecessary detail. All principles, aspects, and embodiments, as well as specific examples thereof, are intended to encompass both structural and functional equivalents of the disclosed subject matter. Additionally, it is intended that such equivalents include both currently known equivalents as well as equivalents developed in the future.

The following description refers to a voice coil speaker apparatus. However, it should be noted that the example embodiments shown and described herein are meant to be illustrative only and not limiting in any way. As such, various modifications will be apparent to those skilled in the art for application to other areas based on technologies other than the above, which may be in various stages of development and intended for future replacement of, or use with, the above described method or apparatus.

Example embodiments of a voice coil speaker are of the type where a speaker frame may support a diaphragm on the top edge by an upper half roll compliance. The diaphragm may be prevented from radial movement and may be allowed to move axially by flexible mounts. The diaphragm may be connected to a voice coil assembly on which a current conducting voice coil is wound. The voice coil may reside in a gap between outer radially polarized permanent magnets and an inner center flux return. Magnetic flux may flow from the permanent magnets across the gap to the center flux return and through the voice coil in a closed loop. The interaction between the current passing through the voice coil and the magnetic field may cause the voice coil to oscillate in accordance with the electrical current and drive the diaphragm to produce sound.

There is a need in the art for a voice coil without a coil former and a speaker using this voice coil which allows a smaller magnetic gap and offset to the shorted coil than a conventional speaker. According to example embodiments, the voice coil may be wound directly onto a set of corner posts without the use of a coil former. The voice coil wire may be under tension and straight between the corner posts. The center flux return and the outer permanent magnets are also flat between the corner posts forming a uniform magnetic gap for the voice coil. The corner posts may establish and maintain an offset of the voice coil from the center flux return. This offset may be small compared to the gap required by a conventional voice coil wound onto a former. The center flux return may include a plated copper or aluminum layer that is continuous around the perimeter. Current flowing through the voice coil may induce a countercurrent in the plated layer in a loop around the center flux return, producing a shorted turn to reduce the voice coil flux linkage and inductance. Because the offset of the voice coil to the plated layer is small, the plated layer may interrupt voice coil flux linkage more effectively than a shorted turn in a conventional voice coil wound onto a former and therefore may be more effective at reducing inductance. A copper or aluminum magnet holder on the outside of the voice coil may additionally reduce voice coil flux linkage and inductance.

In example embodiments of a voice coil speaker, rubber mounts may support the corner posts on the center flux return, providing a high lateral compression stiffness and relatively low axial shear stiffness. The corner supports may conduct voice coil resistance power to reduce coil heating. Close proximity of the voice coil to the center flux return may also reduce heating.

FIG. 1A is an exploded view of the voice coil speaker without coil former 100, according to an example embodiment. Illustrated are a diaphragm assembly 110, a magnet assembly 120, and a voice coil with center flux return assembly 130. This figure introduces the various assemblies of the voice coil speaker without coil former 100. Each constituent assembly, and their relationships and interactions, are discussed further below.

Figure 1B:
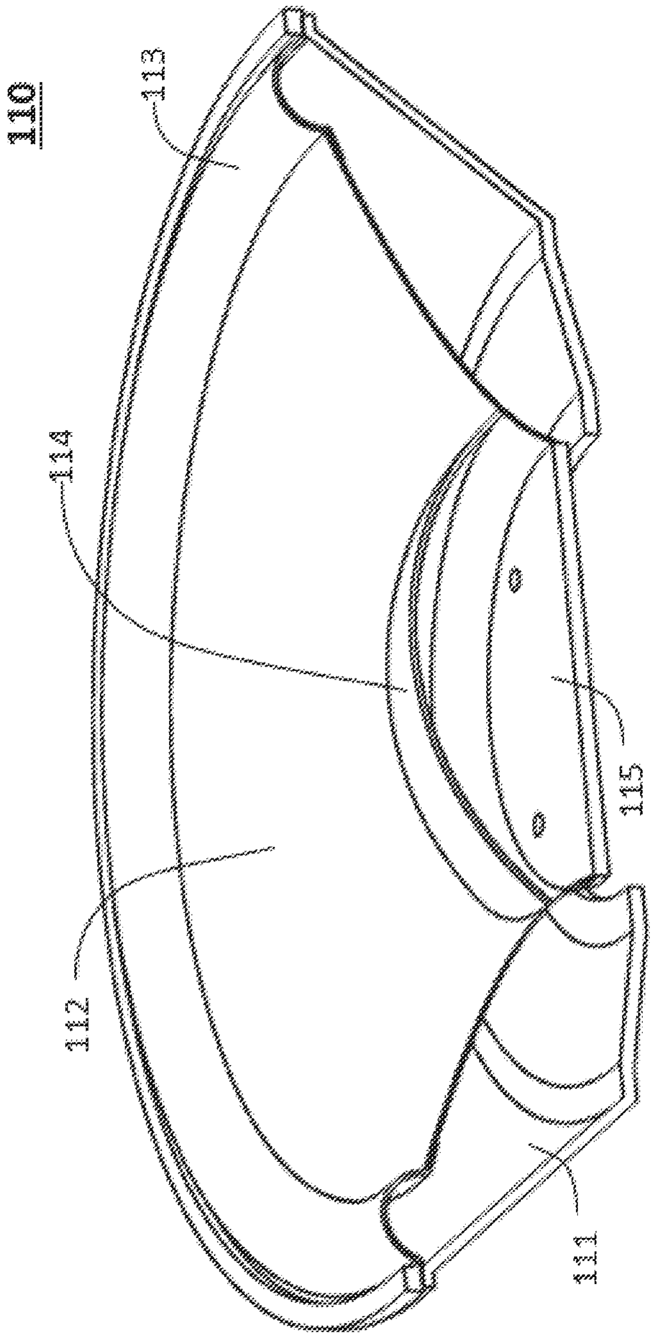
FIG. 1B is a cross-sectional view of a diaphragm assembly of the voice coil speaker without coil former, according to an example embodiment.

FIG. 1B is a cross-sectional view of the diaphragm assembly 110 of the voice coil speaker without coil former, according to an example embodiment. Diaphragm 112 may be supported on the top edge by a flexible upper half roll compliance 113 from a speaker frame 111. The diaphragm 112 may be supported on the bottom edge by a drive plate 115. The diaphragm 112 may be prevented from radial movement and driven to move axially. A dust cap 114 may be also connected to the diaphragm 112 and move with it. Axial movement of the diaphragm 112 and the dust cap 114 may cause alternating compression and rarefaction of the contacting air to produce sound. In some example embodiments, diaphragm assembly 110 may be of a conventional design.

Figure 1C:
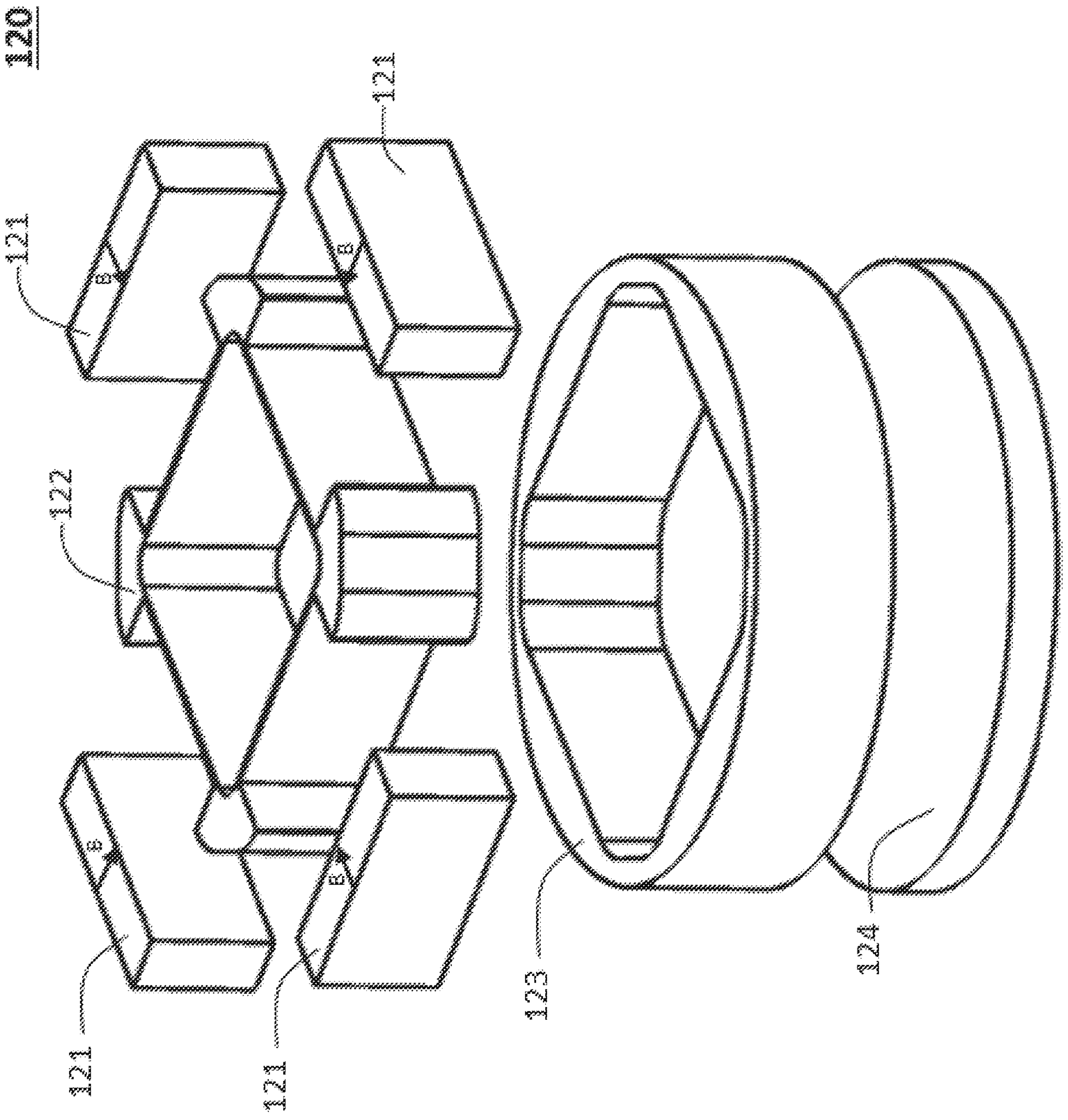
FIG. 1C is an exploded view of a magnet assembly of the voice coil speaker without coil former, according to an example embodiment.

FIG. 1C is an exploded view of the magnet assembly 120 of the voice coil speaker without coil former, according to an example embodiment. Permanent magnets 121 may be polarized through their respective thickness, as indicated. In the present example embodiment, the permanent magnets 121 are polarized in the direction of polarization arrows B. In alternative example embodiments, the direction of polarization may equally be reversed as long as all of the permanent magnets 221 are polarized toward the assembly center or all are polarized away from the assembly center. Permanent magnets 121 may be bonded to a magnet holder 122 and also to a back iron 123. A back plate 124 may be connected to the bottom of the back iron 123. The back iron 123 and the back plate 124 may be preferably made from a ferromagnetic material with a high magnetic permeability and high saturation level such as steel. The magnet holder 122 may be preferably made of a material with high electrical and thermal conductivity, such as aluminum or copper.

Figure 1D:
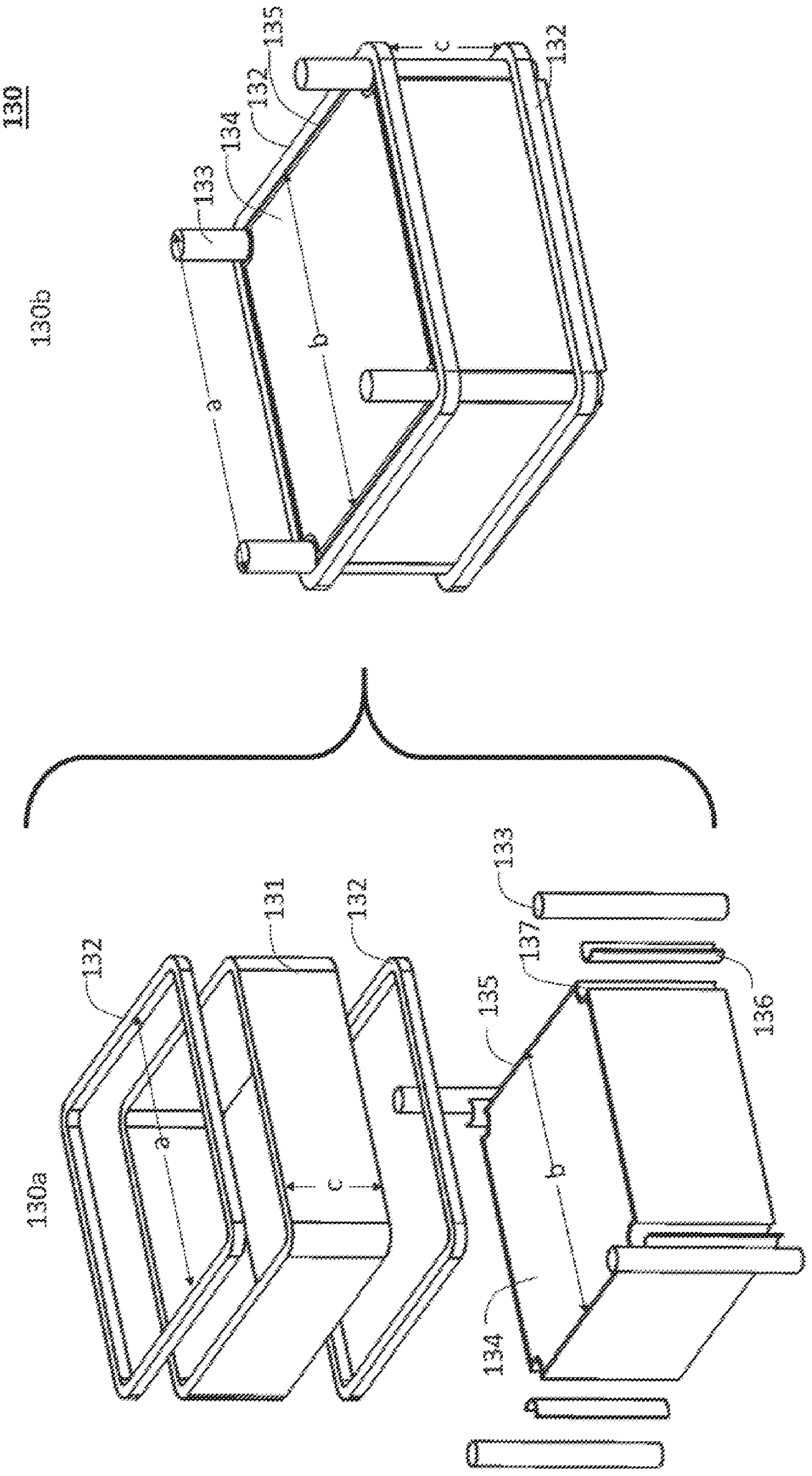
FIG. 1D depicts various views a center flux return assembly of the voice coil speaker without coil former, according to an example embodiment.

FIG. 1D depicts various views a center flux return assembly 130 of the voice coil speaker without coil former, according to an example embodiment. In particular, FIG. 1D depicts an exploded view 130*a* and standard view 130*b* of the voice coil with center flux return assembly 130. Standard view 130*b* is a view of the center flux return assembly 130 prior to a voice coil being wound on.

According to example embodiments, a center flux return 134 may have a plated layer 135 that is continuous around the perimeter. The center flux return 134 may be preferably made from ferromagnetic material with a high magnetic permeability and high saturation level such as steel. The plated layer 135 may be preferably made of a material with high electrical and thermal conductivity such as aluminum or copper. The plated layer 135 may be about 0.5 mm to 1.0 mm thick depending upon the conductivity of the material and the intended frequency band of the speaker.

Corner posts 133 may be bonded to rubber mounts 136. The rubber mounts 136 themselves may be bonded to grooves 137 in the center flux return 134 and the plated layer 135. The corner posts 133 may be supported by the center flux return 134, such that they provide a high lateral compression stiffness and relatively low axial shear stiffness. The corner posts 133 may be preferably made of a material with high electrical and thermal conductivity, such as aluminum or copper.

As shown in FIG. 1D, there may be a width b of the combined center flux return 134 and plated layer 135. There may also be a distance a between the outside edges of the corner posts 133 when installed. Insulating spacers 132 may also have an inside dimension a, such that the insulating spacers 132 may be press fit onto the corner posts 133, helping to hold the corner posts 133 in place in grooves 137. A spacing c may exist between the insulating spacers 132.

A voice coil 131 may be wound directly on to the corner posts 133 between the insulating spacers 132. Therefore, the voice coil 131 may have an inside dimension a and height c as constrained by spacing of the corner posts 133 and the insulating spacers 132. Winding tension may keep the voice coil 131 straight between the corner posts 133. This configuration may maintain a uniform offset from the plated layer 135 of $(a-b)/2$. This offset may be about 0.25 mm or even less.

Figure 2:
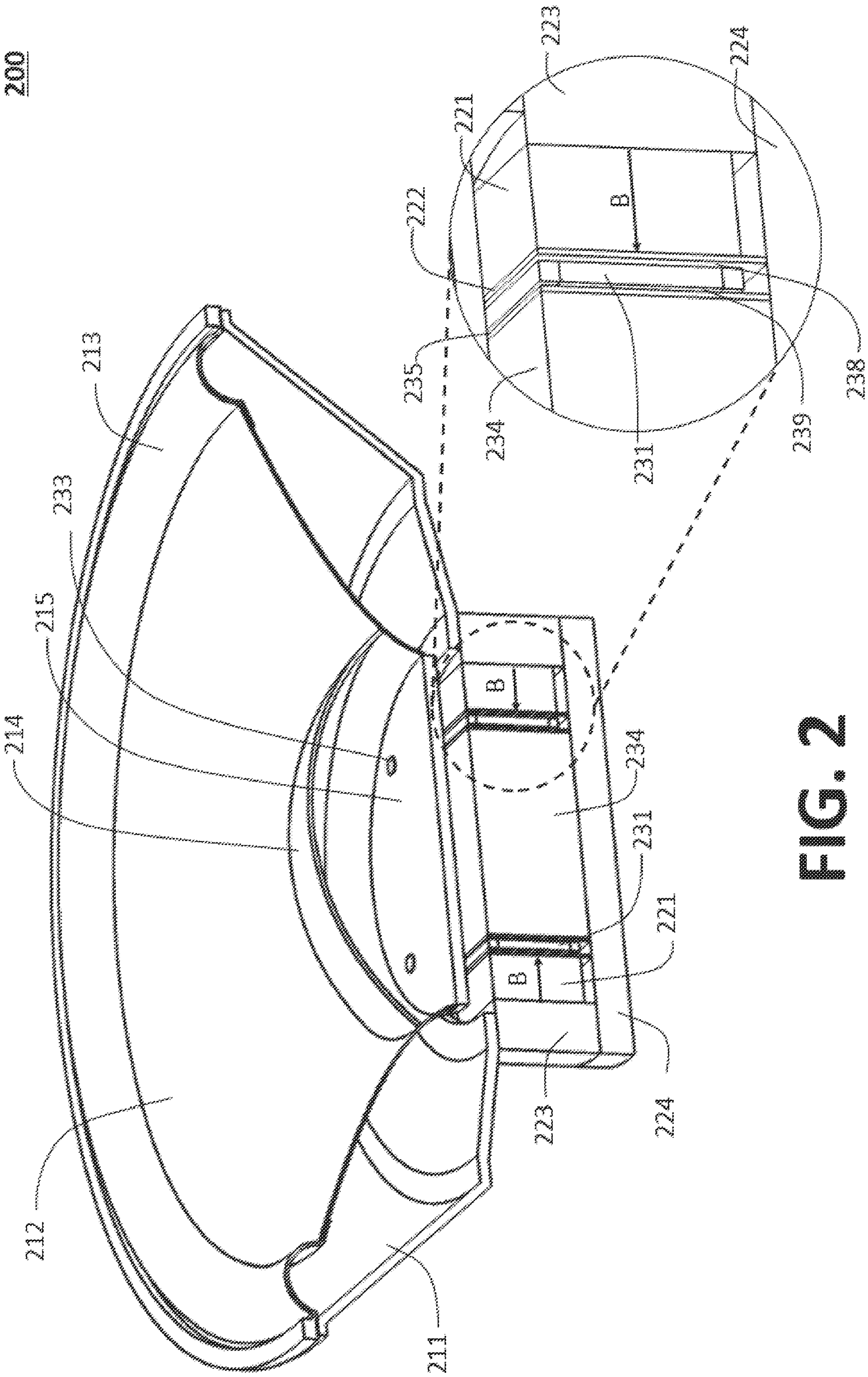
FIG. 2 is a cross-sectional view of the voice coil speaker without coil former, according to an example embodiment.

FIG. 2 is a cross-sectional view 200 of the voice coil speaker without coil former, according to an example embodiment. The cross-sectional view 200 of the voice coil speaker without coil former illustrates the relationship between the various constituent assemblies. More specifically, cross-sectional view 200 illustrates the offset of the voice coil from the center flux return and the gap between the voice coil and the magnet holder, according to an embodiment of the invention. FIG. 2 also depicts an enlarged view of a portion of the voice coil speaker without coil former, according to an example embodiment. The example embodiment in FIG. 2 may be the same as the example embodiment in FIG. 1A.

Cross-sectional view 200, including the enlarged view, illustrate a constituted diaphragm assembly, a magnet assembly, and a voice coil with center flux return assembly. The diaphragm assembly includes a speaker frame 211, a diaphragm 212, a flexible upper half roll compliance 213, a dust cap 214, and a drive plate 215. The magnet assembly includes permanent magnets 221, a magnet holder 222, a back iron 223, and a back plate 224. The center flux return assembly includes voice coil 231, corner posts 233, center flux return 234, an offset 239, and a gap 238.

According to example embodiments, there may be an offset 239 of voice coil 231 from plated layer 235. As previously noted, the offset 239 may be equal to (a−b)/2. The offset 239 may be about 0.25 mm or less. In this example embodiment, a gap 238 between the voice coil 231 and magnet holder 222 may be about 1 mm or less.

Magnetic flux from permanent magnets 221 may pass through magnet holder 222, gap 238, voice coil 231, plated layer 235 and then into center flux return 234. Magnetic flux may then be conducted by the center flux return 234 to back plate 224. The back plate 224 may the conduct the magnetic flux to the back iron 223, which returns it to the permanent magnets 221 to complete the loop.

The interaction between the current passing through the voice coil 231 and the magnetic field may produce oscillating forces in voice coil 231. These forces may be transferred to corner posts 233 and then to attached drive plate 215 and diaphragm 212. Axial movement of diaphragm 212 and dust cap 214 may cause alternating compression and rarefaction of the contacting air to produce sound.

Electrical resistance heat produced in the voice coil 231 may be removed by transfer across offset 239 to plated layer 235 and across the gap 238 to the magnet holder 222. Both of these components may be made of a material with high thermal conductivity to carry away the heat. Heat produced in the voice coil 231 may also be removed by transfer to the corner posts 233 and then to the drive plate 215, which may serve as a heat sink. Magnet holder 222 may shield the permanent magnets 221 from oscillating magnetic fields produced by the voice coil 231 which would otherwise cause eddy current heating of the magnets.

It should be noted that all illustrations are based on the center flux return 234 having fours sides and being of a square cross section and on there being four permanent magnets 221. However, all descriptions hold equally well for a different shape, such as rectangular, or a different number of straight sides, such as three or six. If the center flux return 234 has a different shape or number of sides then the voice coil 231 will take the corresponding shape when it is wound on to the corner posts 233 and will maintain a uniform offset to the plated layer 235, which will effectively serve as a shorted turn to reduce flux linkage and inductance. The number and size of the permanent magnets 221 should correspond to the number and size of straight sides of the center flux return 234. The magnet holder 222 and the back iron 223 should be sized to accommodate the permanent magnets 221.

The example embodiments being thus described, it will be obvious that the same may be varied in many ways. Such variations are not to be regarded as a departure from the disclosed subject matter, and all such modifications are intended to be included within the scope of the disclosed subject matter.

What is claimed is:

1. A voice coil apparatus comprising:

corner posts;

a voice coil wound directly on to the corner posts, the coil forming straight sides between the corner posts due to winding tension;

a center flux return having straight sides and having a continuous plated layer of electrically conductive material, the center flux return being made of a ferromagnetic material; and rubber mounts at corners of the center flux return and supporting the corner posts, and configured to provide high lateral compression stiffness and low axial shear stiffness in order to facilitate axial movement of the voice coil;

wherein the voice coil lacks a coil former;

wherein the rubber mounts and the corner posts establish a uniform offset with relation to voice coil sides and the continuous plated layer of the center flux return;

wherein the continuous plated layer serves as a shorted turn that reduces voice coil flux linkage and inductance.

2. The voice coil apparatus of claim 1, further comprising:

a frame;

a drive plate connected to the corner posts;

a flexible mount allowing relative axial movement;

a diaphragm connected to and supported by the drive plate, the diaphragm connected to the frame by the flexible mount;

radially polarized permanent magnets corresponding to the straight sides of center flux return and having a gap therewith;

a back iron made of ferromagnetic material and in contact with the permanent magnets; and a back plate made of ferromagnetic material and in contact with the back iron and the center flux return;

wherein the voice coil is in the gap between the permanent magnets and the center flux return;

wherein a flux from the permanent magnets flows in a complete loop through the voice coil, the center flux return, the back iron, and the back plate;

wherein the voice coil produces axial force due to interacting with the radial magnetic field when subjected to electrical current flow, the axial force causing the axial movement of the corner posts, the drive plate, and the diaphragm;

wherein the diaphragm causes alternating compression and rarefaction of the contacting air to produce sound.

3. The voice coil apparatus of claim 2, further comprising:

an electrically conductive magnet holder on the outside of the voice coil, the electrically conductive magnet holder configured to reduce the voice coil flux linkage and inductance.

* * * * *